continued.

United States Patent Office

2,965,593
Patented Dec. 20, 1960

2,965,593

PROCESS OF POLYMERIZING MIXTURES OF POLYORGANOSILOXANES AND VINYL MONOMERS AND PRODUCT OBTAINED

Thomas J. Dietz, Chester Heights, Pa.

No Drawing. Filed Aug. 17, 1954, Ser. No. 450,284

9 Claims. (Cl. 260—29.6)

This invention relates to polymerized mixtures of polyorganosiloxanes and vinyl monomers. It also relates to a process for attaining such polymerized mixtures.

More specifically this invention relates to moldable mixtures attained by dispersing normally incompatible polyorganosiloxanes in vinyl monomers and polymerizing said mixtures. In general the contemplated polyorganosiloxanes correspond to

where R and R' are the same or different halogenated or non-halogenated, alkyl, aralkyl, aroxyalkyl, aroxyaryl or other non-polymerizable organic radicals capable of direct union with the silicon atom.

In its preferred embodiment the present invention concerns a water repellent insulating composition comprising over 50% by weight of a styrene-containing thermoplastic high polymer and over 5% by weight of a polyorganosiloxane taken from the group of dimethylpolysiloxane, methyl phenyl polysiloxane, ethyl phenyl polysiloxane, methyl chlorophenyl polysiloxane, di-trichlorophenyl polysiloxane, and di-phenoxyphenyl polysiloxane.

The water repelling characteristics of the polyorganosiloxanes are well known, but for many reasons, notably expense, and the fact that commercially available silicone rubber does not have the mechanical properties required for rigid insulators or insulating coatings or films, a water repellant molding composition, coating or film should not be solely or predominantly of polyorganosiloxanes. However, mixtures of polyorganosiloxanes with thermoplastic high polymers are not readily attainable because the polyorganosiloxanes are incompatible with or have but limited compatibility with most thermoplastic high polymers. It is, of course, possible to modify the basic composition and alternatively or conjointly to limit its proportion to its compatibility range with the thermoplastic high polymer. But such enhancement is attainable only at the expense of structural strength, stability or the water repellent characteristics of the final product. Desired electrical properties may be unattainable.

As a collateral invention upon which application Serial No. 417,699 for U.S. Patent was filed March 22, 1954, and now abandoned, I have demonstrated that polyorganosiloxanes can be mixed mechanically on standard rubber or plastics processing equipment with normally incompatible thermoplastic high polymers while retaining an advantageous balance of physical properties, provided that the base material, the thermoplastic high polymer, is extremely high in apparent weight average molecular weight, i.e., in excess of 5,000,000. Such high weight average molecular weights are attainable as a result of cross-linking of the high polymer chains, and the formation of incipient gel. The invention of the preceding application is limited to mechanically mixed compositions and does not include certain methods of processing which are convenient and economical for the preparation of coating, film forming or potting compositions.

An actual copolymerization of silanes, silanols, or low molecular weight polyorganosiloxanes with a polymerizable monomer such as suggested by Roedel in U.S. Patent 2,420,911, or a chemical reaction of silane with a resin such as suggested by Barry in U.S. Patent 2,561,177 is inordinately expensive and still fails to provide a molding composition of the desired water repellency and electrical properties. However, an intimate mixture of the least complex and frequently the most water repellent polyorganosiloxanes and the dimethylpolysiloxane commercially sold as Silicone SE-76 or Silicone SE-30, with a thermoplastic high polymer of good electrical and structural properties like a styrene-butadiene copolymer which has been polymerized under conditions specified herein will exhibit the desirable properties of both components.

The primary objects of this invention are to provide homogeneous mixtures of polyorganosiloxanes and high molecular weight thermoplastic high polymers, and to provide a process for attaining such mixtures.

Another object of this invention is to obtain improved dielectric materials which have a low coefficient of friction with water, are permanently hydrophobic, and are readily molded.

An additional object resides in the provision of a dielectric material that will resist "icing up."

A further object of this invention is to provide a moldable insulating composition comprising an homogeneously mixed polyorganosiloxane and a thermoplastic high polymer.

A further object of this invention is to provide a coating or film-forming composition comprising an homogeneously mixed polyorganosiloxane and a thermoplastic high polymer.

Still a further object of this invention is to provide a potting composition comprising an homogeneously mixed polyorganosiloxane and a thermoplastic high polymer.

The intimate homogeneous mixtures comprising the compositions of this invention are ordinarily attained by dispersing the polysiloxane in a vinyl monomer base, adding any other monomers, the cross-linking agent, the polymerization catalyst, and any modifiers that may be required. The dispersion is then polymerized under conditions of temperature and pressure required by the polymerization system chosen. However, it should be understood that the invention is not limited to this particular blending operation, but rather to the special types of compositions and blending methods herein disclosed.

The limiting criteria of the homogeneous mixtures or alloys attainable in the practice of this invention are mainly physical as distinguished from chemical, with one exception, the polyorganosiloxane must be dispersible in the base monomer which is to be polymerized to form the thermoplastic high polymer matrix. Thus any polyorganosiloxanes including, for example, the dimethyl, the methyl-ethyl, the methyl-phenyl, the ethyl-phenyl, the methyl-chlorophenyl, the di-trichlorophenyl, the di-phenoxyphenyl polysiloxanes and others are usable so long as the chosen polyorganosiloxane is dispersible in the base monomer alone or diluted in a suitable solvent of low reactivity. Because of their cost factors and their higher degree of water repellency the polyorganosiloxanes enumerated above are preferred, but any saturated organo groups, i.e., substantially non-polymerizable, are also specifically contemplated for the organo constituents of the polyorganosiloxane. Generally speaking, any polyorganosiloxanes having weight average molecular weights falling in the range of 150,000 to "infinite molecular weight" are satisfactory for the practice of this invention, but preferably 400,000 to "infinite molecular weight" provided the degree of cross-linking which may be present in the highest molecular weight species is insufficient to cause infusibility of the polymer. Polyorganosiloxanes of molecular weight much below a weight average of 150,000 exude from the final mixture so rapidly as to interfere with molding operations.

Aside from the necessity of excluding the distinguishing polyorganosiloxanes from the sence in which the term "thermoplastic high polymer" is intended, the primary limitations on the high polymer are likewise physical. Thus, for example, the apparent weight average molecular weight should not be less than 5,000,000 as estimated by sedimentation-diffusion or some other applicable method. The expression "high polymer" as herein used is limited to materials having an apparent weight average molecular weight exceeding 5,000,000. The thermoplastic high polymers are cross-linked to form a retentive network for the polyorganosiloxane. At the same time, the average number of cross-links per primary molecule of the polymer must be limited so as not to interfere objectionably with the rheological properties of the composition, and prevent satisfactory flow as a molding material or adequate dispersion in a suitable liquid vehicle as a coating composition. It is well known in this art that in the early stages of cross-linking, a polymer is still substantially thermoplastic, so that it can be processed with standard mixing equipment. The minimum degree of cross-linking necessary to bring about the onset of infinite network formation has been stated as about one cross-linkage for four polymer molecules—page 261 of Principles of Polymer Chemistry, Paul J. Flory, Cornell University Press, 1953. The maximum molecular weight attained by the "high polymer" component of the composition during polymerization of the dispersion depends on the molecular configuration of the completely gelled or cross-linked polymers having "infinite molecular weights" as referred to in the art, provided the degree of cross-linking is insufficient to interfere objectionably with fusion of the composition in commonly employed mixing or molding equipment. Generally speaking, the compositions resulting from the practice of my invention should have the physical property of millability, fluxibility or fusibility; that is to say, the polyorganosiloxane and the high polymer matrix portions of the polymerized composition must be separately capable of mastication or milling in a Banbury mixer or on a two-roll mill of the type conventional in the rubber industry. If conditions of polymerization or a high concentration of cross-linking agent result in the high polymer matrix being excessively cross-linked, the composition will exhibit poor millability. If, on the other hand, the high polymer matrix is not cross-linked during the polymerization, the interspersed polyorganosiloxane will form a separate phase in the composition with resulting degradation of molding characteristics and mechanical properties.

Thermoplastic high polymers having an incipient cross-linked condition may be obtained in several ways. If in the polymerization of a vinyl monomer, one of the reactive components is a diene, a diolefin, or divinyl monomer, either present unregulated, in a minute amount, or if in larger amount almost completely regulated, the result will be a cross-linked polymer with the cross-links being contributed by the difunctional monomer. Certain divinyl monomers such as divinyl benzene are particularly active in this sense. It is not necessary that the cross-linking be built into the polymer initially. In some cases, a cross-linked graft polymer can be prepared by treating a polymer of one type with a divinyl or diene monomer of a different type under conditions of polymerization. This is called second stage crosslinking (see Second Stage Crosslinking, Herman F. Mark, Chemical & Engineering News 32, 3122, 1954). Bifunctional isocyanates such as hexamethylene diisocyanate are also useful in this respect if the necessary sites are available on the polymer for reaction with the isocyanate groups.

As one embodiment of the present invention, preparation of a homogeneous blend of polystyrene with dimethylpolysiloxane can be accomplished by dissolving the dimethylpolysiloxane (Silicone SE–30) in monomeric styrene, adding a small amount of a bifunctional cross-linking agent together with a suitable polymerization catalyst, and polymerizing to nearly complete conversion. The polymerization system may be prepared according to the following recipe:

| Ingredient | Parts by weight |
| --- | --- |
| styrene (purified) | 95 to 70 } 100. |
| dimethylpolysiloxane (Silicone SE–30) | 5 to 30 |
| divinylbenzene (55% conc.) | 0.02. |
| water | 200 to 1,200. |
| benzoyl peroxide | 0.5. |
| carboxymethyl cellulose | 4 to 24. |

The monomer solution containing the styrene, divinyl benzene, Silicone SE–30 and the benzoyl peroxide is added to the water phase containing the carboxymethyl cellulose in a balloon flask fitted with a reflux condenser and stirrer. Agitation is increased until the monomer phase remains suspended as minute droplets. The temperature is raised to reflux and agitation continued until polymerization is complete. The beads of solid polyorganosiloxane-resin which are formed are readily washed with distilled water and dried to form a molding composition. Normal alternatives in techniques of suspension polymerization, catalysts, modifiers and thickeners known to the art are specifically contemplated herein, provided the polymer which results is essentially thermoplastic and exhibits an apparent weight average molecular weight in excess of 5,000,000.

A preferred embodiment of the invention is exemplified by the following.

| Ingredient | Parts by weight |
| --- | --- |
| styrene (purified) | 95 to 70 } 100. |
| methyl phenyl polysiloxane (Silicone SE–51) | 5 to 30 |
| 1,3 butadiene | 0.10 to 0.05. |
| potassium persulfate (initiator) | 0.10. |
| tribasic sodium phosphate | 0.50. |
| lauryl sodium sulfate (emulsifier) | 2.0. |
| water | 200. |

The methyl phenyl polysiloxane is dissolved in the monomeric styrene and the butadiene cross-linking agent is added. This solution is the so-called oil phase. The aqueous phase consists of the tribasic sodium phosphate and the lauryl sodium sulfate dispersed in the water. The required amount of aqueous phase is placed in a glass pressure vessel and cooled to 0° C., and to it is added the monomer dispersion also cooled to 0° C. The vessel is capped, placed in a metal guard, and shaken vigorously. The guarded vessel is then mounted in a water bath heated to 80° C. and agitated by tilting. After temperature equilibrium is reached, the potassium persulfate which has been dissolved in 3 ml. of distilled water is added to the emulsion with the aid of a hypodermic syringe without releasing the pressure in the reaction vessel. The emulsion is heated for 2 hours at 70° C. followed by 2 hours at 95° C. or long enough to insure nearly complete conversion. Care should be taken to exclude oxygen from the reaction vessel while it is being loaded because of the tendency for small amounts of oxygen to inhibit polymerization. At the completion of polymerization the polymer may be concentrated as a latex for coating applications or coagulated by freezing or alternative method if the polymer is to be used as a molding composition. Normal alternative in techniques of emulsion polymerization initiators, and emulsifiers known in the prior art are specifically contemplated in this invention, provided the polymer which results is essentially thermoplastic and exhibits an apparent weight average molecular weight in excess of 5,000,000.

In a third embodiment of the present invention, from 5 to 50 parts by weight of dimethyl polysiloxane (Silicone SE-30) may be dispersed in from 95 to 50 parts by weight of purified styrene monomer containing 0.01 to 0.5 weight percent of divinyl benzene and 1.0 weight percent of benzoyl peroxide and polymerized in a manner similar to those used for styrene-containing resins in accordance with any of the techniques known to the art.

The benzoyl peroxide is one example of a free radical type catalyst that may be used.

In a further embodiment of the present invention, the reactive components may be diluted with from 50 to 200 parts of an aromatic hydrocarbon solvent such as benzene, tertiary butyl benzene or toluene in order to increase the fluidity of the polymerization mixture. The polymerization of the solution type and the end product will be a solution rather than a solid.

Having thus described my invention, what I claim as novel and desire to secure by Letters Patent of the United States is:

1. The process of making a homogeneous, fusible mixture of a polyorganosiloxane the organo groups of which are linked to the siloxane through a carbon-to-silicon bond and contain no ethylenic unsaturation, said polyorganosiloxane having a weight average molecular weight exceeding 150,000 and a thermoplastic styrene polymer which comprises dispersing the polyorganosiloxane into a monomeric styrene material and polymerizing in the presence of 0.01–0.5% of divinyl benzene to effect cross-linking to an apparent weight average molecular weight in excess of 5,000,000.

2. The process of claim 1, in which the monomeric styrene material contains styrene and butadiene.

3. Polyorganosiloxane-resin compound prepared by the process of claim 1.

4. The process of making a homogeneous, fusible mixture of a po'yorganosiloxane the organo groups of which are linked to the siloxane through a carbon-to-silicon bond and contain no ethylenic unsaturation, said polyorganosiloxane having a weight average molecular weight exceeding 150,000 and a thermoplastic styrene polymer, said polyorganosiloxane corresponding to the formula $$\begin{array}{c} R \\ Si-O \\ R' \end{array}$$

where R and R' are selected from the group consisting of methyl, ethyl, phenyl, chlorophenyl, trichlorophenyl and phenoxyphenyl, which comprises dispersing the polyorganosiloxane into a monomeric styrene material and polymerizing in the presence of 0.01–0.5% of divinyl benzene to effect cross-linking to an apparent weight average molecular weight in excess of 5,000,000.

5. The process of making a homogeneous, fusible mixture of a polyorganosiloxane the organo groups of which are linked to the siloxane through a carbon-to-silicon bond and contain no ethylenic unsaturation, said polyorganosiloxane having a weight average molecular weight exceeding 150,000 and a thermoplastic styrene polymer which comprises the successive steps of:

(a) dispersing from 5 to 50 parts of the polyorganosiloxane in from 95 to 50 parts of a monomeric styrene material containing 0.01–0.5% of divinyl benzene.;

(b) suspending a dispersion in an aqueous medium containing an emulsifier and a polymerization catalyst; and (c) polymerizing the monomers to about 95% conversion and to effect cross-linking to a weight average molecular weight exceeding 5,000,000.

6. A polyorganosiloxane-resin latex dispersion prepared by emulsion polymerization in accordance with the process of claim 4.

7. The process of making a homogeneous, fusible mixture of a polyorganosiloxane the organo groups of which are linked to the siloxane through a carbon-to-silicon bond and contain no ethylenic unsaturation, said polyorganosiloxane having a weight average molecular weight exceeding 150,000 and a thermoplastic styrene polymer which comprises the successive steps of:

(a) dispersing from 5 to 50 parts of the polyorganosiloxane in from 95 to 50 parts of a monomeric styrene material containing 0.01–0.5% of divinyl benzene and a polymerization catalyst;

(b) suspending the dispersion with rapid agitation in from 5 to 15 times its volume in an aqueous medium containing a thickening agent; and (c) polymerizing the monomers to about 95% conversion and to effect cross-linking to a weight average molecular weight exceeding 5,000,000.

8. The process of making a homogeneous, fusible mixture of a polyorganosiloxane the organo groups of which are linked to the siloxane through a carbon-to-silicon bond and contain no ethylenic unsaturation, said polyorganosiloxane having a weight average molecular weight exceeding 150,000 and a thermoplastic styrene copolymer which comprises the successive steps of (a) dispersing from 5 to 50 parts of the polyorganosiloxane in from 95 to 50 parts of a monomeric styrene material containing 0.01–0.5% of divinyl benzene;

(b) adding a polymerization catalyst; and (c) polymerizing the monomers in bulk to about 95% conversion and to effect cross-linking to a weight average molecular weight exceeding 5,000,000.

9. The process of making a homogeneous, fusible mixture of a polyorganosiloxane the organo groups of which are linked to the siloxane through a carbon-to-silicon bond and contain no ethylenic unsaturation, said polyorganosiloxane having a weight average molecular weight exceeding 150,000 and a thermoplastic styrene polymer which comprises the successive steps of:

(a) dispersing from 5 to 50 parts of the polyorganosiloxane in from 95 to 50 parts of a monomeric styrene material containing 0.01–0.5% of divinyl benzene;

(b) adding from 50 to 200 parts of a solvent in low reactivity;

(c) adding a suitable free radical type polymerization catalyst; and (d) polymerizing the monomers in solution to about 95% of conversion and effect cross-linking to a weight average molecular weight exceeding 5,000,000.

References Cited in the file of this patent

UNITED STATES PATENTS

| 2,472,589 | Hershberger | June 7, 1949 |
| 2,539,438 | Kropa et al. | Jan. 30, 1951 |
| 2,787,568 | Koblitz | Apr. 2, 1957 |

FOREIGN PATENTS

| 948,077 | France | Jan. 24, 1949 |